(12) United States Patent
Tohyama et al.

(10) Patent No.: US 6,930,840 B2
(45) Date of Patent: Aug. 16, 2005

(54) MECHANISM ELEMENT FOR OPTICAL DEVICES

(75) Inventors: Seiji Tohyama, Saitama (JP); Hiroshi Kobayashi, Saitama (JP); Shigeo Konno, Saitama (JP)

(73) Assignee: Fujinon Corporation, Saitama (JP)

(*) Notice: Subject to any disclaimer, the term of this patent is extended or adjusted under 35 U.S.C. 154(b) by 41 days.

(21) Appl. No.: 10/390,726

(22) Filed: Mar. 19, 2003

(65) Prior Publication Data

US 2003/0218810 A1 Nov. 27, 2003

(30) Foreign Application Priority Data

Mar. 22, 2002 (JP) ........................................ 2002-080101

(51) Int. Cl.[7] .............................................. G02B 15/14
(52) U.S. Cl. ........................ 359/695; 359/704; 359/694
(58) Field of Search ................................ 359/694, 695, 359/704, 630, 631, 633, 636, 638, 640; 345/7–9

(56) References Cited

U.S. PATENT DOCUMENTS

| | | | | |
|---|---|---|---|---|
| 4,877,495 A | * | 10/1989 | Buchmeier et al. | ......... 205/106 |
| 6,107,001 A | * | 8/2000 | Lewis et al. | ................. 430/302 |
| 6,372,357 B1 | * | 4/2002 | Hayakawa et al. | ...... 428/472.2 |
| 6,633,353 B1 | * | 10/2003 | Seki et al. | ................... 349/113 |

FOREIGN PATENT DOCUMENTS

| | | | | |
|---|---|---|---|---|
| JP | 57037652 A | * | 3/1982 | .............. F24J/3/02 |
| JP | 2002212788 A | * | 7/2002 | ........... C25D/13/10 |

* cited by examiner

Primary Examiner—Georgia Epps
(74) Attorney, Agent, or Firm—Oliff & Berridge, PLC

(57) ABSTRACT

A mechanism element for optical devices has a light-incident part on which light having a wavelength of 700 nm or more is incident, and the light-incident part is made of aluminum or an alloy of aluminum or magnesium. An anodizing process treatment to form an anodized coating is performed at least on the light-incident part, and then the surface of the light-incident part is colored to be black by a secondary electrolytic coloring method.

6 Claims, 2 Drawing Sheets incident light

MECHANISM ELEMENT FOR OPTICAL DEVICES

BACKGROUND OF THE INVENTION

1. Field of the Invention

The present invention relates to a mechanism element for optical devices such as video cameras, telephoto lenses, copiers, laser printers, facsimile machines, or the like, and in particular, relates to a mechanism in which light absorption can be maintained over a wide range of wavelengths.

2. Description of the Related Art

In optical devices such as video cameras up until now, aluminum or alloys of aluminum or magnesium are desirably used as materials for a mechanism element of lensbarrels or the like which hold an optical system elements such as lens system elements from the viewpoint of solidness, workability, manufacturing accuracy, and weight minimization.

Generally, the surfaces of mechanism elements which hold optical system elements are black to reduce stray light due to reflection of incident light. Therefore, in the case in which a mechanism element is produced from the materials mentioned above, it is common for the surfaces of the mechanism element to be blackened after an anodizing treatment by using a black organic dye (hereinafter simply referred to as a "dye"). This blackening process is performed as follows: pores are formed on the surface of the mechanism element by an anodizing treatment, the dye is absorbed into the pores, and the dye is sealed in the pores by a sealing treatment. Alternatively, if a mechanism element is formed of a material which cannot be blackened by the blackening process described above, a black coating can be formed on the surface of the mechanism element. Furthermore, a mechanism element formed by a synthetic resin in which carbon black is mixed may also be provided.

In the a coating technique in which a black coating is used, large dimensional variations may occur due to uneven thickness of the coated film, and furthermore, in a case in which this is used in conditions in which the surface is pressed or rubbed. This is not desirable because the coated film may be partially peeled off forming contaminating matter. Furthermore, in the case in which the optical device is used in outer space, the coated film may be degraded by radiation or volatile components may be emitted. Mechanism elements formed from synthetic resins also have such drawbacks.

On the other hand, because the surface on which an anodizing treatment and a blackening treatment using a black dye are performed absorbs visible light well, exhibits solid characteristics, and dimensional variation due to the coated film and peeling of the coated film do not occur, it is desirable for mechanisms which hold optical system elements such as lens systems. In addition, in the case in which such mechanism elements are used in an optical device to be used in outer space, volatile component content is low, and degradation by radiation can be controlled because the dye is sealed in the pores.

However, in the blackening treatment using a black dye, the following problems have occurred.

(1) The surface of a mechanism element which is blackened using a black dye exhibits low reflectance of 5 to 10% in a wavelength range of 400 to 700 nm, which is in the visible region, and absorbs 90 to 95% of incident light. However, the reflectance gradually increases in the wavelength region above 700 nm. Specifically, the reflectance reaches 40% at 800 nm, 50% at 900 nm, 60% at 1000 nm, and about 80% at 1600 nm. Therefore, although incident light which is reflected by the mechanism element is reduced to 5 to 10% in an optical system for light having wavelengths of 400 to 700 nm, on the other hand, light having a wavelength of 1000 nm, for example, is reduced only to 60%. Actually, such light may be reflected many times in the mechanism element as stray light. For example, in the case of light having a wavelength of 1000 nm, if the light is reflected in the mechanism element two times, 36% of the light becomes stray light. As explained above, in the conventional technique in which the black dye is used, the quantity of stray light is increased by using the device in a wavelength region above 700 nm, and the efficiency of the optical device is deteriorated.

(2) As described above, a blackening process is performed by absorption of black dye into pores of an anodized coating, but the dye can be filled into only about one-third of the depth of the pores because the pores are extremely narrow. On the other hand, if the anodized coating is formed thickly, part of the thickness of the material becomes uneven and the overall thickness also becomes uneven, and furthermore, if the pores are formed to be deep, this results in uneven filled amounts of the dye. Therefore, the anodized coating must be formed to be relatively thick in anticipation of the uneven filled amount of the dye. As a result, to yield a reflectance in the visible light region within a range of 5 to 10%, the thickness of the anodized coating must be more than 15 $\mu$m which is further thicker than the required filled depth of the dye. Therefore, the thickness of the anodizing coating is very uneven, and it is difficult to maintain dimensional accuracy of mechanism elements.

SUMMARY OF THE INVENTION

It is, therefore, an object of the present invention to provide a mechanism element for optical devices in which not only do dimensional variation and peeling not occur, but solid characteristics are exhibited, deterioration by radiation and deleterious effect by volatile components in outer space is small, and low reflectance can be maintained even in a wavelength range of 700 to 1600 nm and more than 1600 nm in some cases, and in which an anodized coating can be made thinner to improve dimensional accuracy.

The inventors of the present invention turned their attention to a secondary electrolytic coloring method. The secondary electrolytic coloring method is a coloring method in which metal is deposited in pores of an anodized coating of alumite or the like by performing electrolysis in an electrolyte primarily containing metallic salt. In this method, metal is deposited primarily in the bottom of pores and the metal is progressively deposited toward the openings of the pores. After an alumite treatment was performed on a material and then a secondary electrolytic coloring method treatment was performed on the material, the reflectance of the material was tested. As a result of the tests, it became obvious that the reflectance did not increase very much even if the wavelength of light exceeded 700 nm, as shown in FIG. 1. It should be noted that reflectance of a material which is blackened by black dye is also shown in FIG. 1 for comparison. As shown in FIG. 1, in the case in which the material is blackened by a black dye, the reflectance suddenly increases when the wavelength of light exceeds 700 nm.

The present invention is based on the results of the research described above, and characteristics of a mechanism element for optical devices of the present invention are that a light-incident part in which light having a wavelength of 700 nm or more is set inside of an optical device, the light-incident part comprises aluminum or an alloy of aluminum or magnesium, and that, after an anodizing treatment which forms an anodized coating was performed on at least the light-incident part, the surface of the light-incident part was colored to be nearly totally black by a secondary electrolytic coloring method treatment.

In the present invention as shown in FIG. 1, the reflectance of light having a wavelength of 700 nm or more can be controlled to be similar to the case of visible light. Therefore, generation of stray light can be efficiently prevented by applying the present invention to a mechanism element of an optical system for optical devices in which infrared light or a laser beam is used. Furthermore, because no coating or synthetic resin is used, dimensional variation is small, solid characteristics are exhibited, peeling does not occur, and in addition, harmful effects by volatile components and deterioration by radiation can be reduced, even when the mechanism element is used in outer space.

Furthermore, the thickness of the anodized coating of a material having the reflectance shown in FIG. 1 is about 5 $\mu$m, and this is substantially thinner than the 15 $\mu$m in the case of a material blackened by a dye. Therefore, in the present invention, not only can the anodizing process treatment cost be reduced by making the anodized coating thinner, but also the dimensional accuracy can be improved. It should be noted that the thickness of an anodized coating is desirably in a range of 3 to 7 $\mu$m, and more desirably in a range of 4 to 6 $\mu$m, to obtain such effects. In addition, because coloring by a secondary electrolytic coloring method treatment is performed in the present invention, discoloration over time is much less than in the case of an anodized coating blackened by dye.

In the secondary electrolytic coloring method, it is desirable that the coating be colored to a dark color which is as near to being totally black as possible. To realize this, it is desirable that an electrolyte mainly containing Sn salt and/or Ni salt be used. Coloring to a dark color is performed by depositing the metal of a main component in pores of the anodized coating. In this case, coloring to almost completely black can be achieved by processing for a long time.

It should be noted that Cu salt can be used instead of the main component mentioned above, or Cu salt and the main component can be used together. After the secondary electrolytic coloring method treatment is performed, sealing treatment on the anodized coating is performed by immersion in a sealing solution such as one with a nickel acetate base or by a hydration reaction by a steam treatment. Alternatively, a tertiary electrolytic coloring method in which a secondary anodized coating is formed under a primary anodized coating and metal is deposited in the pores is known, and this method is also included in the scope of the present invention.

As a mechanism element to which the present invention may be applied, there may be mentioned a lensbarrel which holds single or multiple lens systems, and the present invention is effective therefor. Furthermore, the present invention is most effective in the case in which such an element is used in a vacuum, in particular, in outer space. The present invention is not limited to the lensbarrel and can be applied to all mechanism elements such as housings of optical devices or mask plates of laser scanning devices into which light may enter. Furthermore, as shown in FIG. 1, the reflectance was tested by the inventors in a range of 400 to 1600 nm, and the effects of the present invention were confirmed in the range of 700 to 1600 nm, and it is believed that similar low reflectance can be achieved even in a wavelength region above 1600 nm.

In FIG. 2, reference numeral 1 denotes a lensbarrel, which is provided to an optical device (not shown). The lensbarrel 1 has a body 2, which is approximately cylindrically shaped. A light-incident part 3 is provided at an edge portion of the body 2. Incident light enters from the light-incident part 3 into the body 2. A coating 4 is formed at at least an internal surface of the light-incident part 3. The coating 4 is an anodized coating colored to be nearly black by a secondary electrolytic coloring method treatment. Lenses 5, 6 and 7 are provided inside the body 2.

DESCRIPTION OF THE PREFERRED EMBODIMENTS

Figure 1:
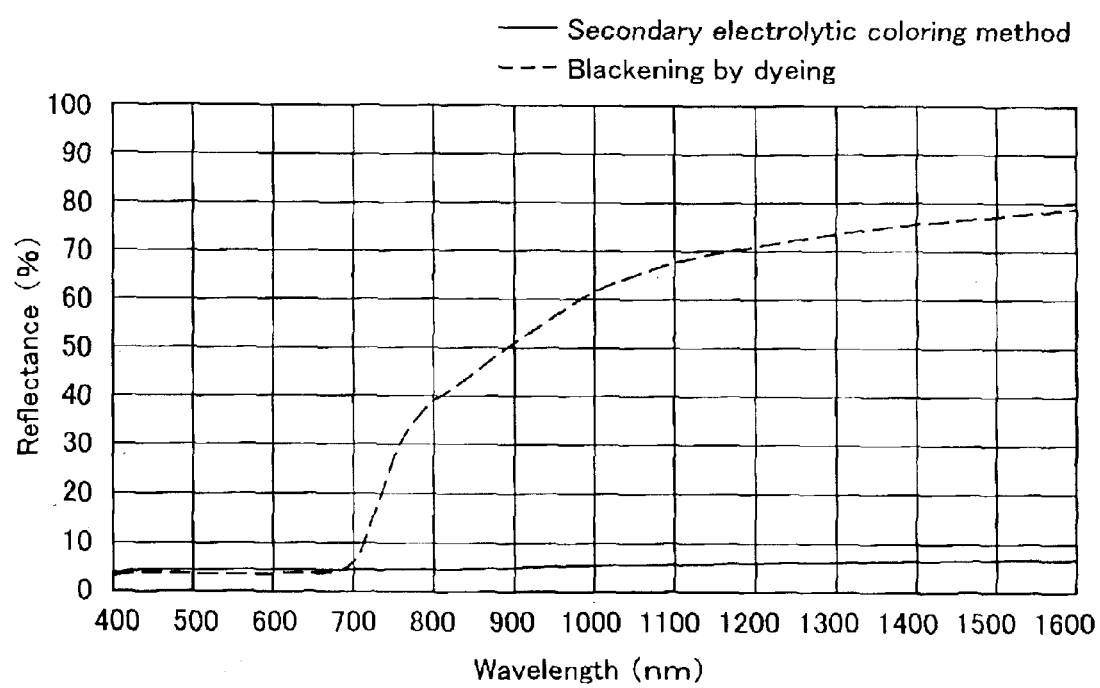
FIG. 1 is a graph showing the relationship of wavelength of light and reflectance.
Figure 2:
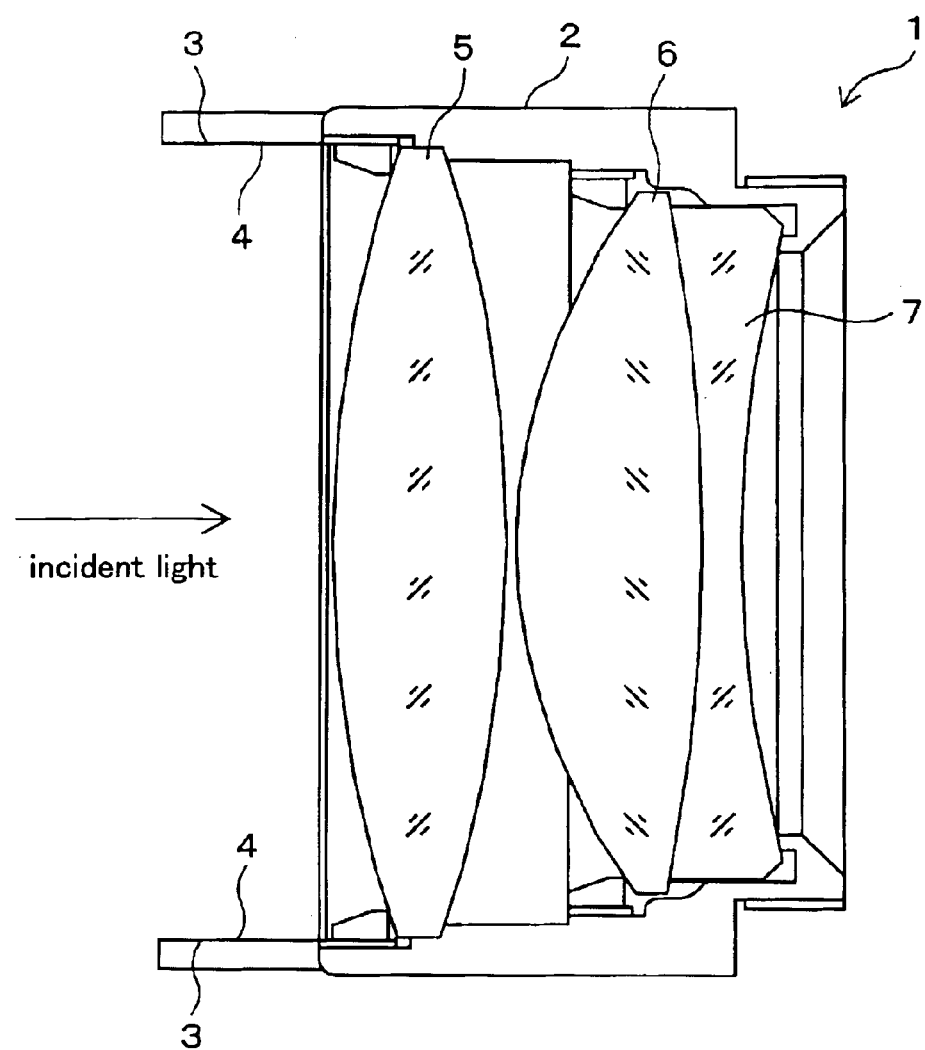
FIG. 2 is a cross-sectional diagram showing a light-incident part of a lensbarrel of an embodiment according to the present invention.

The present invention is further explained by way of Examples.

An aluminum alloy plate having dimensions of length 200 mm, width 200 mm, and thickness 1.2 mm was washed, degreased, and glossiness of the surface was removed by performing etching and desmutting (smut removal), and an anodizing process treatment was performed. An electrolyte used in this process was sulfuric acid bath which contained 130 to 150 g/L of free sulfuric acid and 5 to 15 g/L of dissolved aluminum. The aluminum plate was immersed in the sulfuric acid bath and the anodizing process treatment was performed under the conditions of voltage: 15±3 V, current density: 1.2±0.3 A/dm$^2$, temperature of the electrolyte: 20±2° C., and processing time: 20 minutes. An anodized coating having a thickness of about 5 $\mu$m was obtained.

Next, after washing the aluminum alloy plate which was anodized, a secondary electrolytic coloring was performed. In this process, an acidic bath was used which contained 89 g/L of stannous sulfate, 20 g/L of nickel sulfate hexahydrate salt, 17 g/L of sulfuric acid, 10 g/L of tartaric acid, and a suitable amount of antioxidant. A carbon rod and a nickel plate were used as electrodes, the process was performed for 10 minutes under the conditions of alternating voltage: 15 V, current density: 0.8±0.3 A/dm$^2$, and temperature of electrolyte: 25° C.

Next, the aluminum alloy plate on which the secondary electrolytic coloring process treatment was performed was immersed in a nickel-acetate based sealer solution to perform a sealing process treatment. The obtained aluminum plate was delustered and black, and the reflectance was similar to that of the solid line in FIG. 1.

Aluminum alloy was used in the example described above, but similar effects can be obtained in the case in which a pure aluminum or magnesium alloy is used.

As explained thusfar, a mechanism element for optical devices of the present invention has a light-incident part on which light having a wavelength of 700 nm or more enters an optical device, the light-incident part comprises aluminum or an alloy of aluminum or magnesium, and after an anodizing process treatment which forms an anodized coating was performed on at least the light-incident part, and the surface of the light-incident part was colored black by a secondary electrolytic coloring method. Therefore, solid characteristics can be exhibited, dimensional variations and peeling do not occur, and harmful effects by volatile components and deterioration by radiation are small even when used in outer space. Furthermore, low reflectance can be maintained in the wavelength region of 700 nm or more, and dimensional accuracy can be improved by reducing the thickness of the anodized coating.

What is claimed is:

1. A mechanism element for optical devices comprising:
   a light-incident part inside an optical device in which light having wavelength of 700 nm or more enters,
   the light-incident part comprising:
   aluminum or an alloy of aluminum or magnesium,
   at least the light-incident part subjected to an anodizing process treatment to form an anodized coating, and the anodized coating of the surface of the light-incident part being subjected to a secondary electrolytic coloring method treatment,
   wherein the mechanism element is a lensbarrel holding a single or multiple lens system.

2. The mechanism element for optical devices according to claim 1, wherein the anodized coating has a thickness of 4 to 6 μm.

3. The mechanism element for optical devices according to claim 1, wherein the anodized coating has a thickness of 3 to 7 μm.

4. The mechanism element for optical devices according to claim 1,
   wherein an electrolyte used in the secondary electrolytic coloring method comprises primarily at least one of Sn salt and Ni salt, and a metal thereof is deposited in pores of the anodized coating.

5. The mechanism element for optical devices according to claim 4,
   wherein the mechanism element is used in a vacuum.

6. The mechanism element for optical devices according to claim 1,
   wherein the mechanism element is used in a vacuum.

* * * * *